June 23, 1925.
C. E. GODLEY
COMBINATION TAIL LAMP
Filed March 14, 1924
1,543,079
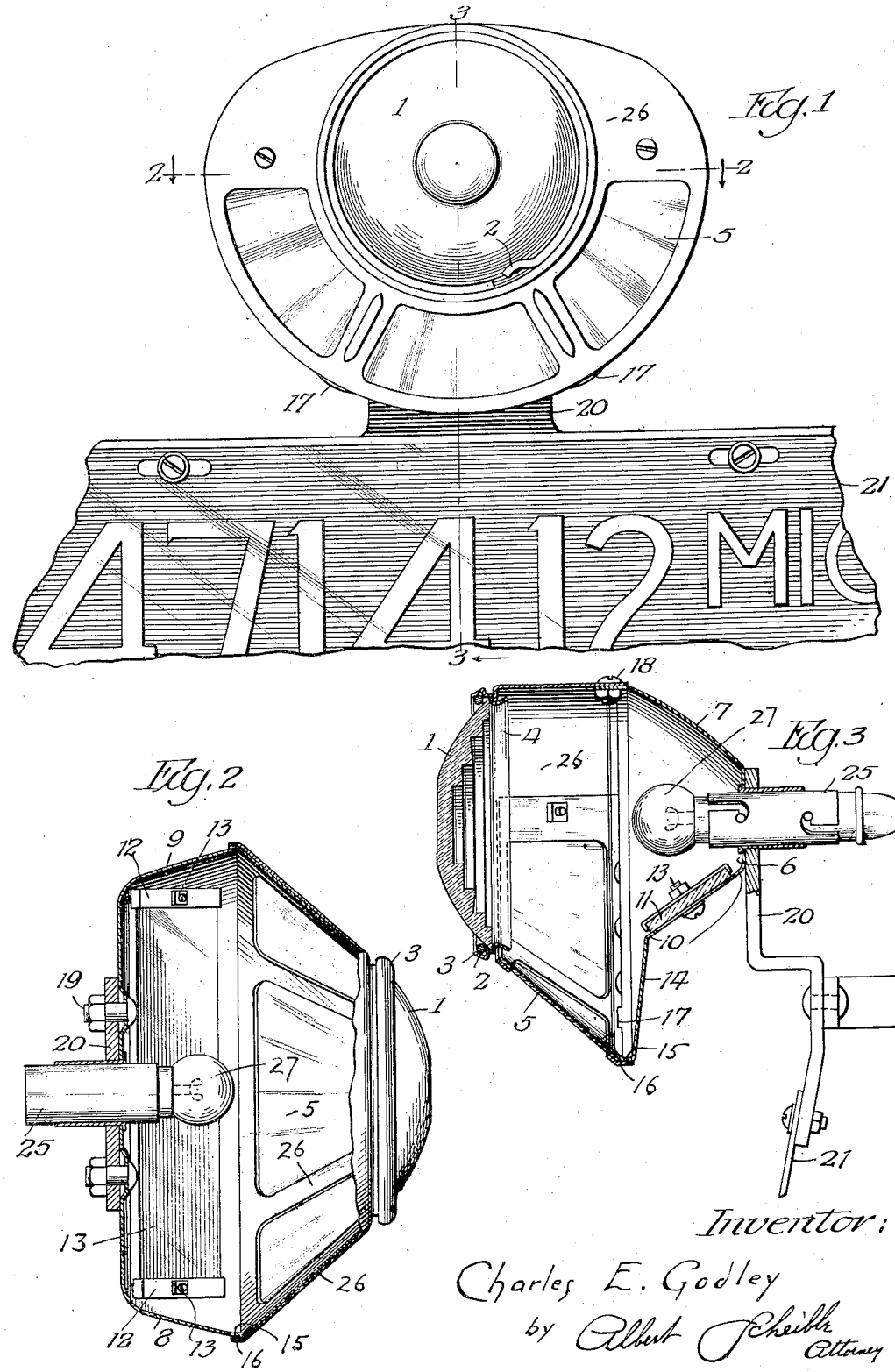

Patented June 23, 1925.

1,543,079

UNITED STATES PATENT OFFICE.

CHARLES E. GODLEY, OF DETROIT, MICHIGAN, ASSIGNOR TO EDMUNDS & JONES CORPORATION, OF DETROIT, MICHIGAN, A CORPORATION OF NEW YORK.

COMBINATION TAIL LAMP.

Application filed March 14, 1924. Serial No. 699,194.

*To all whom it may concern:*

Be it known that I, CHARLES E. GODLEY, a citizen of the United States, residing at Detroit, in the county of Wayne and State of Michigan, have invented certain new and useful Improvements in a Combination Tail Lamp; and I do hereby declare the following to be a full, clear, and exact description of the invention, such as will enable others skilled in the art to which it appertains to make and use the same.

This invention relates to combination lamps or lamps designed for having light from a single lamp bulb distributed in a number of definitely determined directions. More particularly, my invention relates to a lamp adapted for use on the rear of an automobile or other vehicle and aims to provide a simple, compact and inexpensive lamp construction for effectively providing illumination for the several purposes as to which such illumination is continuously needed at the rear of a vehicle. These distinct lighting purposes as served by my lamp are four-fold; namely, the providing of a tail light illumination directed horizontally rearward of the vehicle to warn approaching drivers at a considerable distance, this tail light being also visible at considerable angles; the providing of back-up illuminations on the roadway behind the vehicle and also on the lower portions of objects at either side of the vehicle, and the illumination of the rear license plate.

Generally speaking, I accomplish these purposes in connection with a single lamp bulb by providing the lamp casing with a colored tail light lens coordinated to the position of the lamp filament so as to afford a colored signal which will be clearly visible at a long distance; by providing a window in the lamp casing below the lamp bulb through which direct rays of the lamp can illuminate the license plate; by providing window openings through which direct rays of light from the lamp bulb can issue in obliquely downward directions for the back-up roadway lighting, and providing a reflector for directing added and considerably distributed light through the same window openings; and by providing other reflector portions for directing light from the lamp towards either side of the lamp somewhat rearwardly of the vehicle so as to illuminate adjacent objects above the ground, as for example the fenders and wheels of adjacent vehicles, or the lower portions of adjacent buildings. Furthermore, I desirably accomplish the above named objects in a lamp having transparent window portions approximately at right angles to the directions in which rays of light pass through the same, and one in which the lamp casing is formed of relatively few parts, one of which parts has the needed reflector portions provided upon its interior surface.

Further features which I desirably employ for accomplishing the above purposes will appear from the following specification (in which I use the terms "forward" and "rearward" as applied in the usual sense to the lamp itself, so that "forward" with respect to the tail lamp means "rearward" as applied to the vehicle), and from the accompanying drawings. In these drawings, Fig. 1 is a front elevation of a lamp embodying my invention, showing this in connection with a supporting bracket and a portion of a license plate carried by this bracket.

Fig. 2 is a central and vertical section through the same lamp.

Fig. 3 is a horizontal section through the same lamp, taken along the common axis of the socket and lens.

In the illustrated embodiment, the housing of my lamp includes a casing composed of three metal parts, namely a rearwardly flaring lamp front which has one or more windows for affording the back-up and side illumination, a lens ring which carries the tail light lens and which also holds one end of the back-up window pane in position, and a rear lamp body. This lamp body has inner reflecting surfaces, has a window for illuminating the license plate, carries a socket for the lamp bulb, and is secured to the lamp front so as to afford a rigid casing supported by the lamp body.

Referring to the drawings, the tail light lens 1 (here shown as of a Fresnel type, and desirably red in color) is clamped by a spring 2 within a lens ring 3. This ring has a rearwardly directed flange 4 spun into a corresponding opening in the forward end of the lamp front, the rear portion of the flange being spaced from the interior of the lamp front sufficiently to admit one longitudinal edge of a celluloid window pane 5 between them. The lamp front 26 is flared out rearwardly from its said connection to the lens ring and desirably is of a generally frusto-conical shape excepting that its top is flattened to correspond in size and shape of the upper mouth portion of the lamp body. The greater part of the lower part of the lamp front 26 is cut out to afford window openings which desirably terminate at each side of the lamp somewhat below the axis of the lens ring, these openings being closed against rain and dust by the transparent celluloid pane 5 which closely conforms to the shape of the adjacent and substantially semi-frustoconical part of the lamp front.

The lamp body or rear portion of the casing as here illustrated includes a rear portion shaped substantially like a forwardly open deep pan having a vertically disposed flat bottom 6 (which forms the forward rear of my lamp), a substantially flat top 7 sloping upwards forwardly of the lamp, a pair of curved ends 8 and 9, and a flat frame 10 sloping downward forwardly of the lamp. The opening in this frame is closed by a pane 11, here shown as of glass and as secured to the frame 10 by a pair of metal clips 12 fastened to the frame by bolts 13. The lamp body also desirably has a downward extension or web 14 depending from the lower forward edge of the frame 10 and corresponding in its lower contour to the lower semi-frustoconical part of the lamp front, and the lamp body is fastened at its rear end to the larger end of the lamp front. For this latter purpose, I desirably form the adjoined ends of these two casing parts with relatively overlapping flanges, such as a flange 15 on the lamp body telescoped into a flange 16 on the lamp front. Then I desirably provide the end of the inner flange 15 with outwardly directed lugs 17 extending through corresponding slots in the outer flange 16, so that the said two casing parts can be rigidly fastened to each other by a single bolt 18 extending through the two flanges on the opposite edge of the casing from the lugs 17.

The flat rear end portion 6 of the lamp desirably carries suitable means, such as bolts 19, for securing the casing to a suitable supporting portion of the vehicle, such as a bracket 20 to which the usual rear license plate 21 is secured. By disposing the rear window above the bottom of the casing, I can readily place the license plate much closer to the source of light than could otherwise be done and hence can effectively light this plate by direct rays from the lamp filament while employing the entire upper reflector portion for another purpose.

Secured to some portion of the lamp back is a lamp socket 25, here shown as extending through the end portion 6 and as disposed for holding a lamp bulb 27 so that the filament of the lamp is disposed above the rear window pane 11 but somewhat forwardly of the center of this glass pane. The lens 1 is desirably so formed that the lamp bulb when thus supported has its filament substantially on the axis of the lens, thereby securing a substantially uniform illumination of the colored tail lens to make this visible for considerable distance.

The interior of the parts 7, 8 and 9 is desirably mirror plated, so as to form effective reflectors integral with these parts for reflecting rays of light from the lamp filament in several useful directions.

Thus, the top reflecting surface 7 directs light obliquely downward through the transparent celluloid and the openings in the lower semi-frustoconical part of the lamp front, thereby affording a roadway illumination of considerable spread for a back-up light. The end reflectors 8 and 9 reflect light through the celluloid pane 5 at considerable angles to a vertical plane taken through the axis of the lamp, thereby lighting somewhat elevated adjacent objects, such as the fenders and wheel hubs of adjacent vehicles. Hence these various reflector parts effectively redirect light for affording the downward and the lateral back-up illumination, while the license plate is lighted by direct downward rays from the filament.

By terminating the window openings in the lower semi-frustoconical part of the lamp front 26 somewhat below the axis of the lens (which in the illustrated embodiment is also the axis of the lamp socket, thereby permitting a focusing socket to be employed if desired), I prevent direct rays of light from reaching any one at the side of the lamp even when such a person is somewhat to the rear of the lamp. Also, by sloping the window frame 10 downwardly toward the front of the lamp, I permit both direct rays of light and rays redirected by the top and side reflectors 7, 8 and 9, to reach the openings in the lamp front effectively for providing a widely distributed back-up illumination.

Moreover, I accomplish all of these highly desirable results in a quite simple, compact and inexpensive lamp construction. However, while I have illustrated and described the lamp of my invention in an embodiment having certain highly desirable details, I do not wish to be limited to the particular arrangement and shaping of the various parts, it being obvious that many changes might be made without departing either from the spirit of my invention or from the appended claims.

In practice, I desirably slope the depending web or extension 14 of the lamp back forwardly downward from its juncture with the frame 10 so as to dispose this extension substantially in a plane passing through the center of the lamp bulb filament, thereby minimizing the shadows cast by the portions of the casing between the two windows. I also desirably slope the frame 10 downward forwardly of the lamp so as to prevent the forward edge of the window pane 11 and the upper edge of the extension 14 from interfering materially with the rays of light passing to the celluloid windows direct from the lamp filament and from the top reflector 7. In doing so, I can still maintain the glass pane 11 substantially at right angles to the direction in which the direct rays of light pass from the lamp filament to the license plate. Likewise, by forming the forward window or windows in a lower casing portion of a frusto-conical shape coaxial with the lens, I can readily dispose the various parts of the celluloid pane 5 substantially at right angles to the directions in which light is directed through them. Hence I avoid wasteful reflections of light from the inner surfaces of both of the window panes.

I claim as my invention:—

1. A tail lamp for vehicles, comprising a casing including a rearwardly flaring front portion having a frontal opening and a bottom aperture, and including a forwardly flaring back portion adjoined to the front portion and provided on its interior with reflecting surfaces and having a bottom opening; a lens closing said frontal opening, transparent closures for the bottom aperture and the said bottom opening; and a light bulb mounted in the casing and having its filament disposed within the forwardly flaring back portion and above the said bottom opening.

2. A tail lamp for vehicles, comprising a casing including a rearwardly flaring front portion having a frontal opening and a bottom aperture, and including a forwardly flaring back portion adjoined to the front portion and provided on its interior with reflecting surfaces and having a bottom opening; a lens closing said frontal opening, transparent closures for the bottom aperture and the said bottom opening; and a light bulb mounted in the casing and having its filament disposed within the forwardly flaring back portion and above the said bottom opening; the reflecting surfaces having portions thereof arranged respectively for reflecting light through the said bottom aperture in forwardly downward and laterally downward directions.

3. A tail lamp for vehicles, comprising a casing including a rearwardly flaring portion having a frontal opening and a bottom aperture, and including a forwardly flaring portion adjoined to the aforesaid portion and provided on its interior with reflecting surfaces and having a bottom opening; a lens closing the said frontal opening, transparent closures for the said bottom aperture and the said bottom opening; and a light bulb mounted in the casing and having its filament disposed within the forwardly flaring casing portion and above the said bottom opening, the said bottom aperture extending up along both sides of the rearwardly flaring portion and the reflecting surfaces having parts thereof formed for distributing reflected light rays throughout said aperture.

4. A tail lamp for vehicles, comprising a casing including a rearwardly flaring portion having a frontal opening and a bottom aperture, and including a forwardly flaring portion adjoined to the aforesaid portion and provided on its interior with reflecting surfaces and having a bottom openings; a lens closing the said frontal opening, transparent closures for the said bottom aperture and the said bottom opening; and a light bulb mounted in the casing and having its filament disposed within the forwardly flaring casing portion and above the said bottom opening, the said bottom aperture extending up along both sides of the rearwardly flaring portion and the reflecting surfaces having a part thereof flattened at the top to afford an upwardly forward inclined upper reflector disposed for reflecting light from the filament through the said aperture.

5. In a tail lamp, a casing having a frontal opening and having a pair of bottom windows disposed one behind the other, a colored lens closing the frontal opening, a source of light disposed above and in vertical alinement with the rear window and substantially on the axis of the lens, and reflecting means for redirecting rays from the source of light through the forward window only.

6. In a tail lamp, a casing having a frontal opening and having a pair of bottom windows disposed one behind the other, a colored lens closing the frontal opening, a source of light disposed above and in vertical alinement with the rear window openings substantially on the axis of the lens, and reflecting means for redirecting rays from the source of light through the forward window, the rear window being disposed higher than the forward one and the casing having a wall extending downward behind the forward window from the forward edge of the rear window to the bottom of the casing.

7. In a tail lamp, a casing having a frontal opening and having a pair of bottom windows disposed one behind the other, a colored lens closing the frontal opening, a source of light disposed above and in vertical alinement with the rear window and substantially on the axis of the lens, and reflecting means for redirecting rays from the source of light through the forward window, the rear window being disposed higher than the forward one and relatively close to the source of light to permit rays from the latter to issue at angles of considerable divergence through said window; the casing having a wall extending downward from the forward edge of the rear window to the bottom of the casing behind the forward window, the said wall being substantially in a plane passing through the source of light so as to prevent said wall from casting a shadow.

Signed at Detroit, Michigan, March 4th, 1924.

CHARLES E. GODLEY.